April 27, 1926.
G. A. DUMAS
1,582,644
CHOCOLATE COATING MACHINERY
Filed Nov. 12, 1924      3 Sheets-Sheet 1
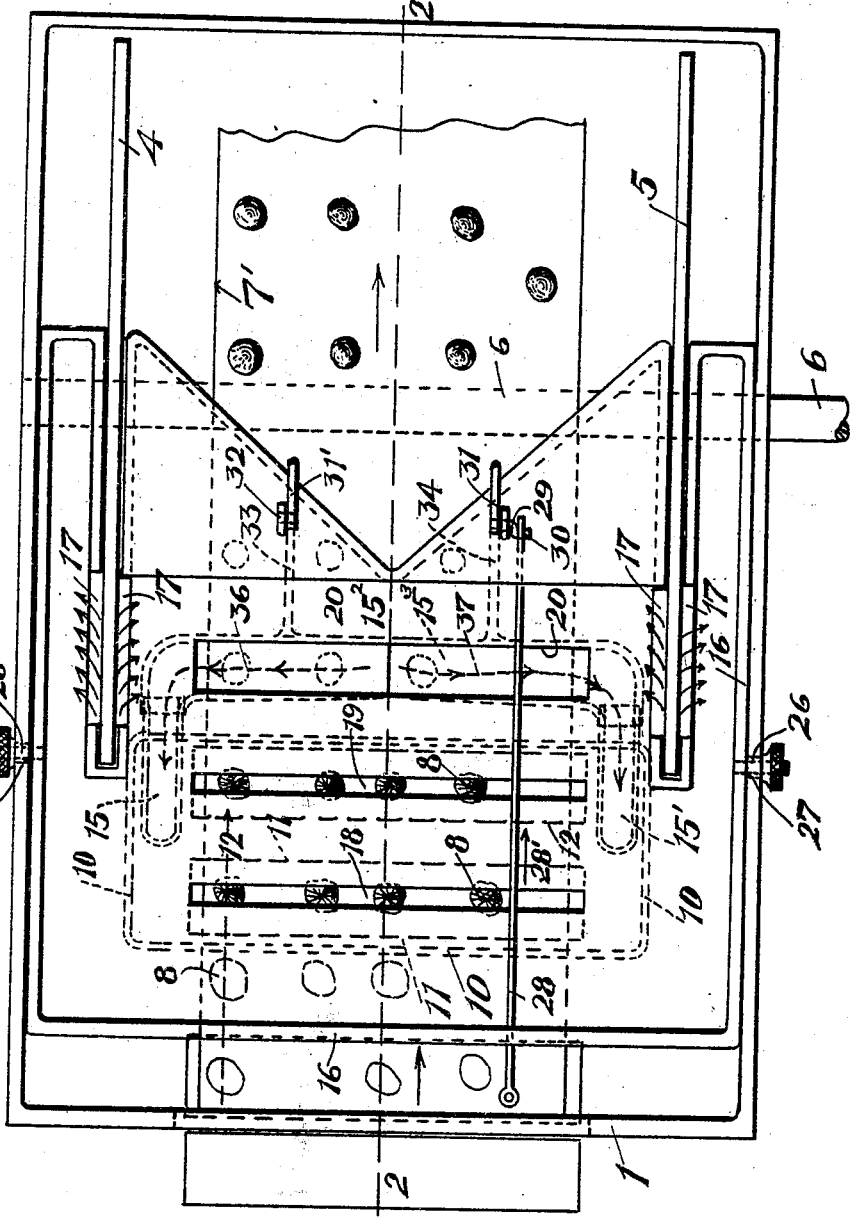
INVENTOR.
George A. Dumas
BY
Harry N. Bowen
ATTORNEY.

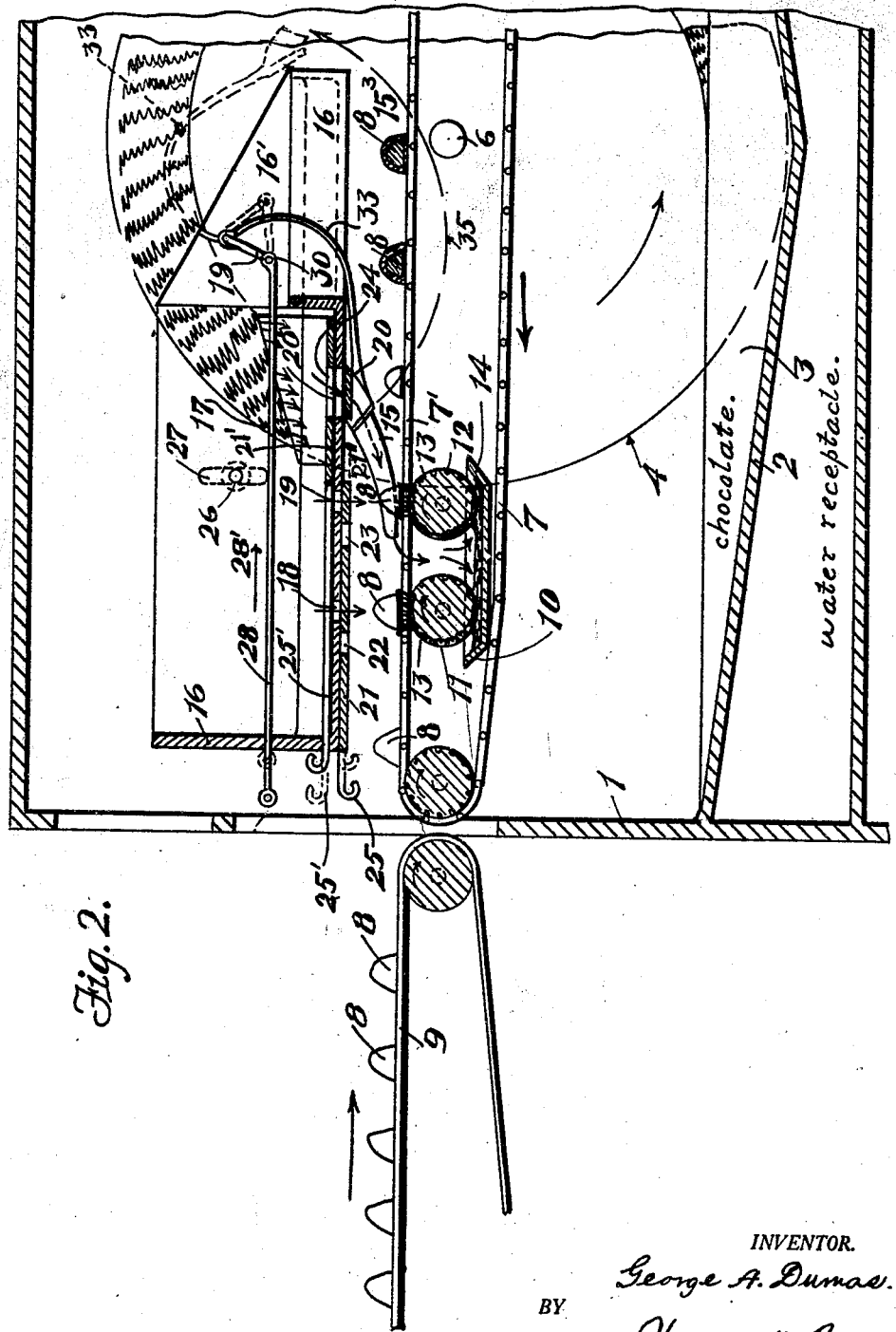

April 27, 1926.
G. A. DUMAS
1,582,644
CHOCOLATE COATING MACHINERY
Filed Nov. 12, 1924 3 Sheets-Sheet 3
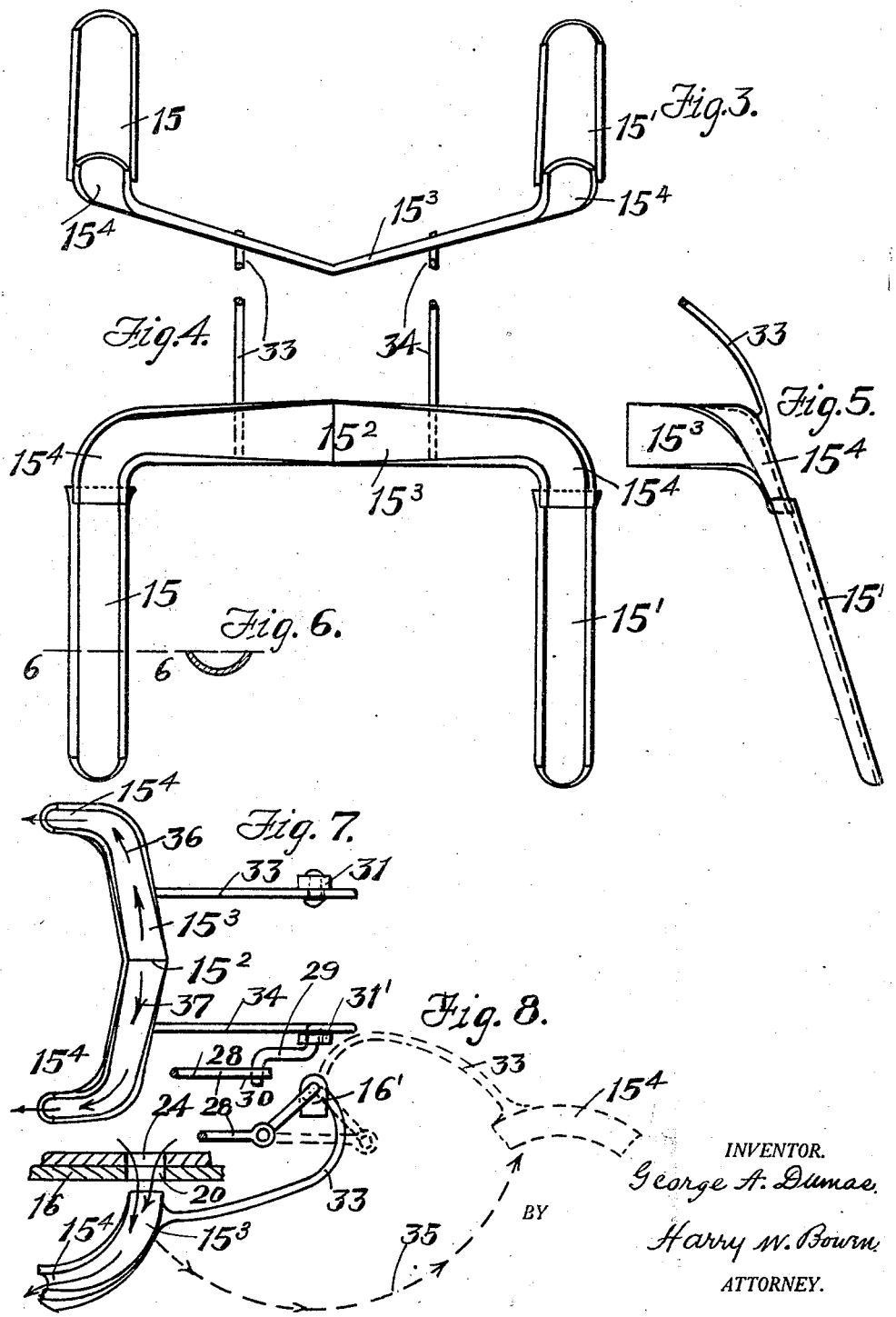
INVENTOR.
George A. Dumas,
BY
Harry W. Bown.
ATTORNEY.

Patented Apr. 27, 1926.

1,582,644

UNITED STATES PATENT OFFICE.

GEORGE A. DUMAS, OF SPRINGFIELD, MASSACHUSETTS, ASSIGNOR OF ONE-FOURTH TO HERBERT L. HANDY, SR., ONE-FOURTH TO HERBERT L. HANDY, JR., AND ONE-FOURTH TO HERMAN H. HANDY, ALL OF SPRINGFIELD, MASSACHUSETTS.

CHOCOLATE-COATING MACHINERY.

Application filed November 12, 1924. Serial No. 749,425.

*To all whom it may concern:*

Be it known that I, GEORGE A. DUMAS, a citizen of the United States, residing at Springfield, in the county of Hampden and State of Massachusetts, have invented new and useful Improvements in Chocolate-Coating Machinery, of which the following is a specification.

This invention relates to improvements in chocolate coating machinery. An object of the invention is to supply a coating of liquid chocolate as desired, either to the upper surface only, or to the lower surfaces only of the cores or creams of the confection. If desired the chocolate coating may be simultaneously supplied to both the upper and lower surfaces, that is to say to completely coat the cores or creams of the confection. In some makes or kinds of confections it is desirable to coat only the upper or bottom surface of the cores or creams. In machines now in use the cores are usually flooded from a point above the cores and the surplus coating material is then blown off or removed by suitable air pressure before the completed confections are delivered to the cooling part of the machine.

The present invention includes a pair of rotatably mounted disks which revolve in a receptacle in which the chocolate coating material is placed and which material is constantly maintained at a definite temperature for liquefying the same which is about 87 or 88 degrees Fahrenheit. When the disks are revolved the coating material adheres to the disks and is carried upward by the same. At a certain point during the rotative movement, scraper devices are provided which engage the opposite sides of the disks for removing the coating material. This material, as fast as it is removed, is collected in a suitable receptacle from which it flows downward in a tray, in which rotatable devices are located for automatically conveying this material upward and directly against the lower side of an endless traveling woven wire, or reticulated belt, on which the cores or creams are placed to be coated. The coating material is then transferred from these rollers directly to the lower surface of the cores.

If desired, by the operation of suitable valves, the coating material may be permitted to flow downward from the receiving receptacle directly onto the upper surface of the cream, whereby the upper surfaces only of the creams will be coated. If desired both the upper and lower surfaces of the creams may be coated.

Referring to the drawings;

Fig. 1 is a plan view of the machine with the upper cover removed showing the upper edges of the two rotatable disks, the trough or receptacle for receiving the removed material from the disks, also the means for delivering or conveying the removed coating material downward onto the endless conveyors on which the cores or creams or other filling substances are placed or into a receptacle below the conveyor when the bottoms only are to be coated.

Fig. 2 is a vertical sectional view on a plane represented by the line 2—2 of Fig. 1 showing one of the coating elevating disks, the receptacle which receives the removed coating material, the valves for controlling the flow of material from this receptacle downward either into a trough in which the rollers are placed, or directly onto the upper surface of the endless conveyor.

Fig. 3 is a plan view of the trough member showing the two side arms or spouts and the elevated center portion which conveys the coating material in opposite directions to the spouts which delivers the material into the receptacle below the endless conveyor.

Fig. 4 is a plan view of Fig. 3.

Fig. 5 is a side elevational view of Fig. 4 showing one of the spouts.

Fig. 6 is a transverse sectional view on the line 6—6 of Fig. 4 showing the formation of one of the trough members.

Fig. 7 is a plan view of the movable part of the trough member, and

Fig. 8 is a side view of Fig. 7.

Referring to the drawings in detail:

The present invention relates to the structure shown, described, and claimed in my prior Letters Patent #1,503,527, dated August 5, 1924, for an improvement in chocolate coating machines in which structure rotatable disks are employed for elevating the coating material.

1 designates the receptacle having the inclined bottom portion 2 in which collects the viscous chocolate coating material 3. Any suitable means is employed for maintaining the water below the bottom 2 at a constant or definite temperature. 4 and 5 designate two disks which constantly dip into and rotate in the coating material 3. They are secured to the rotatable supporting shaft 6 which is driven by any suitable motive power, not shown. 7 designates an endless conveyor which is composed of woven wire for receiving the creams or cores of the confection 8 from the delivery belt 9 at the entrance end of the machine. These cores are placed on the upper strand of the conveyor. Located below the upper strand 7' of the conveyor belt 7 is a tray 10 and mounted for rotation in this tray are the two cylindrical shaped rollers 11 and 12, which rollers may be formed with the longitudinal channels or recesses 13 for the purpose of more efficiently gathering or collecting the chocolate coating material indicated at 14 in this tray and carrying it upward against the lower surfaces of the creams. The tray 10 is supplied with the coating material by means of the two spouts 15 and 15' which conducts the coating material from the receiving receptacle 16. Scrapers 17 which engage and are located on opposite sides of each of the two disks 4 and 5 are provided for removing the chocolate material therefrom as these disks, which are located in the chocolate receiving receptacle 1 is rotated. A detail of one of the disks being shown in Fig. 2. Formed in the bottom of the receptacle 16 are the openings 18, 19, and 20 which are shown in the plan view in Fig. 1 and in the sectional view in Fig. 2. 21 designates a slide valve for opening and closing the openings 18, 19, and 20. In this valve are formed the openings 22 and 23 and in the valve 21' is the opening 24. In the position shown, the openings 20 and 24 are in registration with each other permitting the coating material to flow directly downward onto the center portion $15^2$ of the member $15^3$; the oppositely located ends $15^4$ of which rest directly upon the fixed spouts 15 and 15' and into the tray 10 which is located below the upper strand 7' of the endless belt where it is collected and carried or transferred upward by the rollers 11 and 12 against the lower surfaces of the creams. Since the lower side of the upper strand of the conveyor belt 7 contacts with these rollers the coating of chocolate is forced directly upward through the meshes of the upper strand and directly into contact with the lower surface of the creams or cores 8, whereby a layer of chocolate will be placed on the bottom surfaces only of the cores. Should it be desired to coat the upper surfaces of the cores, the valve 21 is operated and the openings 18 and 22, 19 and 23 are placed in registration with each other when the valve 21 is moved into the dotted line position 21" thus permitting the upper surfaces of the cores to be flooded as well as their bottom surfaces to be coated. The slide valve 21' is operated by means of the rod 25' which is attached thereto for opening and closing the openings 22, 23, and 20 for the purpose already stated. The receptacle 16 is adjustably supported in the main casing 1 by means of the pins 26 which are located in the vertical slots 27 as shown in Fig. 1. Attached to the center portion $15^2$ of the member $15^3$ which directs the flow of chocolate from the openings 20 and 24 in opposite directions onto the spouts 15 and 15' to the forward end of the machine are the rods 33 and 34. The rod 34 is pivotally connected to the crank arm 29 at the point 30. The crank arm is rotatably mounted on a fixed part 16' of the receptacle 16, as shown in Figs. 2 and 3 by means of the bracket 31. 31' is another bracket which is located in alignment with the bracket 31. Secured in this bracket is a pivot pin 32 on which is located the link or arm 33; the other end of this link is attached to the center and swingable part $15^2$ of the member $15^3$ which directs the flow of the chocolate from the receptacle 16 laterally in opposite directions to the two side spouts 15 and 15'. It should be stated and particularly noticed that the center part $15^3$ is the part with the oppositely located side spouts $15^4$, which swings away from the fixed spouts 15 and 15' and is operated by the rod 28. The curved end portions $15^4$ (see Fig. 3) rest under the two laterally located fixed spouts 15 and 15'. When the rod 28 is moved inward, as indicated by the arrow 28', the center member $15^3$ is swung downward on its two pivots which are attached to the brackets 31. This movement is clearly indicated in Figs. 2 and 3 by the curved line 35. When this center part $15^3$ is swung rearward by the operating rod 28 the chocolating coating material in the receptacle may now freely flow downward through the registering openings 20 and 24 directly onto the upper surfaces of the cores or creams of the confections that are to be coated. If desired, the operator may move the slide valve 21 with the rod 25 and bring the openings 18 and 22, and 19 and 23 into registration with the resulting effect that the chocolate coating material in the receptacle 16 will now flow downward in three streams onto the upper surfaces of the confections instead of one. If it is desired to coat both the upper and lower surfaces of the cores the operator, by means of the rod 28, swings or returns the centrally located member $15^3$ into its original position under the openings 20 and 24. The coating material now flows through the openings 20 and 24 onto this member at which point the stream divides and flows in opposite directions onto the side spouts 15 and 15' as indicated by the dotted lines 36 and 37 on Fig. 1 and into the receptacle 10, from which it is taken up. At the same time the coating material is flowing through the registering openings 18 and 22, and 19 and 23. By operating the rod 25' the opening 20 may be closed. Now only the upper surfaces of the creams are being coated.

It will therefore be seen that I have provided a very efficient and simple construction for coating the cores of chocolate confections on either their upper or lower surfaces only, or, on both of these surfaces.

What I claim is:

1. A confectionery coating machine having in combination with only a single endless carrier on which the articles to be coated are placed when the coating takes place, a receptacle below the said carrier for receiving the coating material, means including grooved rollers for conveying the coating material to only the under surface of the article.

2. A confectionery coating machine having in combination a single endless carrier on which the articles to be coated are placed, a receptacle for receiving the coating material, grooved roller means for conveying the coating material to only the under surface of the article, and means including a receptacle for the coating material and a slide valve for simultaneously conveying the coating material from the receptacle to both the upper and lower surfaces of the article.

3. In a confectionery coating machine, the combination, a single movable reticulated conveyor on which the articles to be coated are placed, a receptacle for receiving the supply of coating material, means for conducting the material to a second receptacle, and grooved roller means in the second receptacle for transferring the said material to the bottom surface of the articles.

4. In a confectionery coating machine, the combination, with a single movable recticulated conveyor on which the articles to be coated are placed, a receptacle for receiving the supply of coating material, means for conducting the material to a second receptacle, and means in the second receptacle for transferring the said material to the bottom surface of the articles, consisting of a rotatable grooved roller member which is located between the second receptacle and the reticulated article conveyor member, and means for rotating said member.

5. In combination, a device to receive an article, as the core of a confection to be coated on its upper and lower surfaces, a receptacle for receiving the coating material, as liquid chocolate, a source of supply of the material, means comprising a rotatable disk and a scraper engaging one side of the disk for transferring the material to the receptacle, and means for simultaneously transferring the material from the receptacle to the said surfaces of the article.

6. In combination, a device to receive an article, as the core of a confection to be coated, a receptacle for receiving the coating material, as liquid chocolate, a source of supply of the material, means comprising a rotatable disk and a scraper for transferring the material to the receptacle, and means for transferring the material from the receptacle to the article, comprising a member having oppositely located spout portions, a second receptacle into which the spout portions discharge the coating material from the receptacle, and means located between the second receptacle and the article receiving device for transferring the said material to the bottom of the cores.

7. In a confection coating machine, the combination, a receptacle for receiving the coating material, having a discharge opening, a member located below the opening and formed with oppositely inclined surfaces for conducting the material into a second receptacle, means for closing the opening, and means for swinging the member away from its normal position below the opening whereby the discharged material will flow directly downward onto an article to be coated, and means for conveying the article below the opening.

8. A machine for coating only the upper surfaces of the cores of a confection, comprising in combination, an articulated travelling carrier member on which the cores are placed, means for operating the member, a receptacle for containing a supply of the coating material, and having discharge openings, a slide valve having openings for registering with said openings for opening or closing the same, the carrier being located below the openings, a material receiving member below some of the openings for conveying the material away from the upper surfaces of the cores, whereby the quantity of coating material delivered may be varied.

9. A machine for coating only the upper surfaces of the cores of a confection, comprising in combination, an articulated travelling carrier member on which the cores are placed, means for operating the member, a receptacle for containing a supply of the coating material, and having discharge openings, a slide valve having openings for registering with said openings for opening or closing the same, the carrier being located below the openings, a material receiving member below some of the openings for conveying the material away from the upper surfaces of the cores, whereby the quantity of coating material delivered may be varied, and means for supplying the coating material to the receptacle comprising a rotatable disk, and a scraper engaging a side of the disk for removing the material.

10. A device for the purpose described comprising a member having an elevated center part and oppositely extending portions, which terminate in trough or channel shaped ends, means for pivotally connecting the member to a receptacle having an opening through which a coating material is discharged, and means for moving the member away from the opening.

11. A confection coating machine comprising a receptacle for receiving a supply of the coating material, a rotatable disk located in the receptacle, scrapers engaging the opposite sides of the disk for removing the material, a receptacle for collecting the same, and formed with a discharge opening, a member below the opening onto which the material falls, for conveying the material in opposite directions into a second receptacle, means for moving the member away from its normal position below the opening and means for opening or closing the discharge opening.

GEORGE A. DUMAS.